(12) United States Patent
Chiba et al.

(10) Patent No.: US 9,255,007 B2
(45) Date of Patent: *Feb. 9, 2016

(54) COPPER FOIL FOR PRODUCING GRAPHENE AND METHOD OF PRODUCING GRAPHENE USING THE SAME

(75) Inventors: Yoshihiro Chiba, Ibaraki (JP); Tatsuya Yamaji, Ibaraki (JP)

(73) Assignee: JX Nippon Mining & Metals Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/122,930

(22) PCT Filed: May 31, 2012

(86) PCT No.: PCT/JP2012/064077
§ 371 (c)(1),
(2), (4) Date: Feb. 10, 2014

(87) PCT Pub. No.: WO2012/165548
PCT Pub. Date: Dec. 6, 2012

(65) Prior Publication Data
US 2014/0183160 A1    Jul. 3, 2014

(30) Foreign Application Priority Data

Jun. 2, 2011 (JP) .................................. 2011-124686
Nov. 15, 2011 (JP) .................................. 2011-249471
Nov. 29, 2011 (JP) .................................. 2011-260500

(51) Int. Cl.
*C01B 31/04*    (2006.01)
*C01B 31/02*    (2006.01)
(Continued)

(52) U.S. Cl.
CPC ............. *C01B 31/0453* (2013.01); *B01J 23/72* (2013.01); *B21B 1/00* (2013.01); *B32B 15/20* (2013.01); *B82Y 30/00* (2013.01); *B82Y 40/00* (2013.01); *C01B 31/02* (2013.01); *C22C 9/00* (2013.01);
(Continued)

(58) Field of Classification Search
CPC ......... C01B 31/0446; C22C 9/00; C22F 1/08; C22F 1/00; B21B 2003/005; B21B 3/00; B21B 1/227
See application file for complete search history.

(56) References Cited

U.S. PATENT DOCUMENTS 7,479,590 B1 *  1/2009  Kuczynski .................... 428/545
2004/0110015 A1  6/2004  Narui et al.
(Continued)

FOREIGN PATENT DOCUMENTS

JP    2000-256765    9/2000
JP    2002-120050    4/2002
(Continued)

OTHER PUBLICATIONS

International Search Report corresponding to International Patent Application No. PCT/JP2012/053945 dated May 29, 2012.
(Continued)

*Primary Examiner* — Duy Deo
(74) *Attorney, Agent, or Firm* — Jenkins, Wilson, Taylor & Hunt, P.A.

(57) ABSTRACT

A copper foil for producing graphene, including oxides and sulfides each having a diameter of 0.5 μm or more having a total number of 15/mm$^2$ or less measured by using a scanning electronic microscope before heating at 1000° C. for 1 hour in an atmosphere containing 20% by volume or more of hydrogen and balance argon.

7 Claims, 8 Drawing Sheets (51) Int. Cl.

| | |
|---|---|
| B82Y 30/00 | (2011.01) |
| B82Y 40/00 | (2011.01) |
| B01J 23/72 | (2006.01) |
| B21B 1/00 | (2006.01) |
| B32B 15/20 | (2006.01) |
| C22C 9/00 | (2006.01) |
| C22C 9/02 | (2006.01) |
| C22F 1/08 | (2006.01) |
| B01J 37/18 | (2006.01) |
| B01J 27/04 | (2006.01) |
| B01J 37/00 | (2006.01) |

(52) U.S. Cl.
CPC ... *C22C 9/02* (2013.01); *C22F 1/08* (2013.01); *B01J 27/04* (2013.01); *B01J 37/0009* (2013.01); *B01J 37/0081* (2013.01); *B01J 37/18* (2013.01); *Y10T 428/12431* (2015.01)

(56) References Cited

U.S. PATENT DOCUMENTS

| | | |
|---|---|---|
| 2009/0047539 A1 | 2/2009 | Dobashi |
| 2009/0155561 A1 | 6/2009 | Choi et al. |
| 2010/0038115 A1 | 2/2010 | Matsuda et al. |
| 2011/0070146 A1 | 3/2011 | Song et al. |
| 2011/0195207 A1 | 8/2011 | Hong et al. |
| 2011/0201739 A1* | 8/2011 | Beall .......................... 524/325 |
| 2012/0132516 A1* | 5/2012 | Zimmerman ............ 204/157.41 |
| 2014/0196841 A1* | 7/2014 | Chiba et al. .................. 156/246 |
| 2014/0216650 A1 | 8/2014 | Chiba |
| 2014/0246399 A1 | 9/2014 | Chiba |
| 2014/0353278 A1 | 12/2014 | Chiba et al. |

FOREIGN PATENT DOCUMENTS

| | | |
|---|---|---|
| JP | 2004-074214 | 3/2004 |
| JP | 2004-284938 | 10/2004 |
| JP | 2006-281249 | 10/2006 |
| JP | 2009-143799 | 7/2009 |
| JP | 2009-215146 | 9/2009 |
| JP | 2010-227971 | 10/2010 |
| JP | 2011-051801 | 3/2011 |
| JP | 2011-063506 | 3/2011 |
| JP | 2011-070830 | 4/2011 |
| JP | 2011-162877 | 8/2011 |
| JP | 2012-006824 | 1/2012 |
| JP | 5298225 | 9/2013 |
| WO | WO 2012/111840 | 8/2012 |
| WO | WO 2012/165051 | 12/2012 |
| WO | WO 2012/165548 | 12/2012 |
| WO | WO 2013/047053 | 4/2013 |
| WO | WO 2013/065601 | 5/2013 |
| WO | WO 2013/073367 | 5/2013 |
| WO | WO 2013/168646 | 11/2013 |
| WO | WO 2014/027528 | 2/2014 |

OTHER PUBLICATIONS

International Search Report corresponding to International Patent Application No. PCT/JP2012/059652 dated May 17, 2012.
International Search Report corresponding to International Patent Application No. PCT/JP2012/064077 dated Aug. 23, 2012.
Japanese Industrial Standard. JIS Z8741.
Japanese Industrial Standard. JIS-H3100.
Japanese Industrial Standard. JIS-H3250.
Japanese Industrial Standard. JIS-H3510.
Li et al., "Large-Area Synthesis of High-Quality and Uniform Graphene Films on Copper Foils," Science. vol. 324, No. 5932 pp. 1312-1314 (2009).
Luo et al., "Effect of Substrate Roughness and Feedstock Concentration on Growth of Water-Scale Graphene at Atmospheric Pressure," Chemistry of Materials. vol. 23, No. 6 pp. 1441-1447 (2011).

Notification of Transmittal of Translation of the International Preliminary Report on Patentabililty (Chapter I or Chapter II of the Patent Cooperation Treaty) corresponding to International Patent Application No. PCT/JP2012/053945 dated Aug. 22, 2013.
Notification of Transmittal of Translation of the International Preliminary Report on Patentability (Chapter I or Chapter II of the Patent Cooperation Treaty) corresponding to International Patent Application No. PCT/JP2012/059652 dated Dec. 2, 2013.
Notification of Transmittal of Translation of the International Preliminary Report on Patentability (Chapter I or Chapter II of the Patent Cooperation Treaty) corresponding to International Patent Application No. PCT/JP2012/064077 dated Dec. 2, 2013.
Written Opinion corresponding to International Patent Application No. PCT/JP2012/053945 dated Aug. 18, 2013.
Alfa Aesar, copper foil product information available online at http://www.alfa.com/ja/GP140W.pgm?task=product&srchtyp=ELEM&PSvalue=Copperfoil&element=Cu&group=988.0000 , downloaded Dec. 12, 2012.
Gao et al., "Efficient Growth of High-Quality Graphene Films on Cu Foils by Ambient Pressure Chemical Vapor Deposition," Applied Physics Letters, vol. 97, No. 18, pp. 183109-1-183109-3 (Nov. 1, 2010).
International Search Report corresponding to International Patent Application No. PCT/JP2012/077745 dated Dec. 11, 2012.
International Search Report corresponding to International Patent Application No. PCT/JP2012/078124 dated Nov. 27, 2012.
Luo et al., "Large Scale Synthesis of Bi-Layer Graphene in Strongly Coupled Stacking Order," Condensed Matter, 1-20 (Dec. 3, 2010); URL:http://aps.arxiv.org/ftp/arxiv/papers/1012/1012.0701.pdf.
Notification of Transmittal of Translation of the International Preliminary Report on Patentability (Chapter I or Chapter II of the Patent Cooperation Treaty) corresponding to International Patent Application No. PCT/JP2012/077745 dated May 8, 2014.
Notification of Transmittal of Translation of the International Preliminary Report on Patentability (Chapter I or Chapter II of the Patent Cooperation Treaty) corresponding to International Patent Application No. PCT/JP2012/078124 dated May 15, 2014.
Wofford et al., "Graphene Islands on Cu Foils: The Interplay between Shape, Orientation, and Defects," Nano Letters, vol. 10, pp. 4890-4896 (Oct. 27, 2010).
Written Opinion corresponding to International Patent Application No. PCT/JP2012/077745 dated Dec. 11, 2012.
Written Opinion corresponding to International Patent Application No. PCT/JP2012/078124 dated Nov. 15, 2012.
European Search Report corresponding to European Application No. 12747854.3-1362 dated Oct. 6, 2014.
International Search Report corresponding to International Patent Application No. PCT/JP2013/068636 dated Aug. 27, 2013.
Japanese Industrial Standard. JIS Z2241.
Notification of Transmittal of Translation of the International Preliminary Report on Patentability (Chapter I or Chapter II of the Patent Cooperation Treaty) corresponding to International Patent Application No. PCT/JP2013/068636 dated Feb. 26, 2015.
Official Action corresponding to U.S. Appl. No. 13/985,931 dated May 8, 2015.
Restriction Requirement correponding to U.S. Appl. No. 14/356,142 dated Mar. 12, 2015.
Restriction Requirement corresponding to U.S. Appl. No. 14/355,348 dated Feb. 26, 2015.
European Search Report corresponding to European Application No. 12793061.8-1355 dated May 12, 2015.
Smoukov et al., "Freestanding Three-Dimensional Copper Foils Prepared by Electroless Deposition on Micropatterned Gels," Advanced Materials, vol. 17, No. 6 pp. 751-755 (2005).
Sukang Bae et al., "Roll-to-ro ll production of 30-inch graphene films for transparent electrodes," Nature Nanotechnology, vol. 5, No. 8 pp. 574-578 (2010).
European Search Report corresponding to European Application No. 12850534.4-1362 dated Nov. 3, 2015.
Notice of Allowance corresponding to U.S. Appl. No. 13/985,931 dated Oct. 23, 2015

(56) References Cited

OTHER PUBLICATIONS

Notice of Allowance corresponding to U.S. Appl. No. 14/356,142 dated Oct. 27, 2015.
Official Action corresponding to U.S. Appl. No. 14/355,348 dated Nov. 3, 2015.
Official Action corresponding to European Patent Application No. 12850534.4-1362 dated Dec. 8, 2015.
Restriction Requirement corresponding to U.S. Appl. No. 14/122,942 dated Sep. 30, 2015.

* cited by examiner

Fig. 3 position of DM in plane direction

COPPER FOIL FOR PRODUCING GRAPHENE AND METHOD OF PRODUCING GRAPHENE USING THE SAME

FIELD OF THE INVENTION

The present invention relates to a copper foil for producing graphene, and a method of producing graphene using the same.

DESCRIPTION OF THE RELATED ART

Graphite has a layered structure where a plurality of layers of carbon six-membered rings planarly arranged is laminated. The graphite having a mono atomic layer or around several atomic layers is called as graphene or a graphene sheet. The graphene sheet has own electrical, optical and mechanical properties, and in particularly has a high carrier mobility speed. Therefore, the graphene sheet has expected to be applied in various industries as a fuel cell separator, a transparent electrode, a conductive thin film for a display device, a "mercury-free" fluorescent lamp, a composite material, a carrier for Drug Delivery System (DDS) etc.

As a method of producing the graphene sheet, it is known that graphite is peeled with an adhesion tape. However, there are problems in that the number of the layer(s) of the graphene sheet obtained is not uniform, a wide area graphene sheet is difficult to be provided, and it is not suitable for mass production.

A technology has been developed that a sheet-like monocrystal graphitized metal catalyst is contacted with a carboneous substance and then is heat treated to grow the graphene sheet (Chemical Vapor Deposition (CVD) method) (Patent Literature 1). As the monocrystal graphitized metal catalyst, there is described a metal substrate made of Ni, Cu or W, for example.

Similarly, a technology has been reported that a graphene film is formed by the chemical vapor deposition method on a copper layer formed on a Ni or Cu metal foil or a Si substrate. The graphene film is formed at about 1000° C. (Non-Patent Literature 1).

PRIOR ART LITERATURE

Patent Literature

[Patent Literature 1] Japanese Unexamined Patent Publication (Kokai) 2009-143799

Non-Patent Literature

[Non-Patent Literature 1] SCIENCE Vol. 324 (2009) P1312-1314

SUMMARY OF INVENTION

Problems to be Solved by the Invention

However, it is not easy and spends high costs to produce the monocrystal metal substrate, a wide area substrate is difficult to be provided, and a wide area graphene sheet is thus difficult to be provided, as described in Patent Document 1. On the other hand, Non-Patent Document 1 describes that Cu is used as the substrate. Graphene is not grown on a copper foil in a plane direction within a short time. A Cu layer formed on a Si substrate is annealed to provide coarse grains, thereby providing a substrate. In this case, a size of graphene is limited to the size of the Si substrate, and its production costs are high, too.

Here, the reason for superiority of the copper as the catalyst of graphene growth is that the copper little dissolves carbon. When the copper acts as the catalyst, carbon atoms produced by thermal decomposition of a hydrocarbon gas form graphene on the surface of the copper. Once the copper is covered with graphene, the copper no longer acts as the catalyst. The hydrocarbon gas will not be further thermally decomposed, and a plurality of graphene layers is unlikely formed. Instead, a graphene monolayer is provided. In this regard, a copper monocrystal is good as a substrate for producing graphene. However, as the copper monocrystal is expensive and has a limited size, it is not suitable to form a large area graphene film.

On the other hand, the copper foil can easily provide the large area. However, when the present inventor produced graphene using the copper foil as the substrate, it was found that a sheet resistance of graphene increased to degrade a quality.

Accordingly, an object of the present invention is to provide a copper foil for producing graphene being capable of producing graphene having a large area with low costs, and a method of producing graphene using the same.

Means for Solving the Problems

A first aspect of the present invention provides a copper foil for producing graphene, including oxides and sulfides each having a diameter of 0.5 μm or more having a total number of 15/mm$^2$ or less measured by using a scanning electronic microscope before heating at 1000° C. for 1 hour in an atmosphere containing 20% by volume or more of hydrogen and balance argon.

A second aspect of the present invention provides a copper foil for producing graphene, including oxides and sulfides each having a diameter of 0.5 μm or more having a total number of 100/mm$^2$ or less measured for an area having a total area of 3 mm$^2$ within a depth of 10 μm from a surface that is a cross-section in parallel to the rolling direction by using a scanning electronic microscope before heating at 1000° C. for 1 hour in an atmosphere containing 20% by volume or more of hydrogen and balance argon.

A third aspect of the present invention provides a copper foil for producing graphene, having a number of a dent portion being 20/mm$^2$ or less, the dent portion having a depth ds of 1.5 μm or more being countered; ds=DS−DM; where DM is a lowest height by measuring 1 mm$^2$ surface by using a confocal microscope and by each height profile of a granular part surrounded by a contour in the two dimensional image of the surface obtained; the 1 mm$^2$ surface being heated at 1000° C. for 1 hour in an atmosphere containing 20% by volume or more of hydrogen and balance argon, and DS is a highest height that is regarded as a base line in an area of ±25 μm along a plane direction and a rolling direction from the position of DM.

A fourth aspect of the present invention provides a copper foil for producing graphene, having a number of a convex portion being 100/mm$^2$ or less, the convex portion having a height dt of 1.5 μm or more being countered; dt=HM−HS; where HM is a highest height by measuring 1 mm$^2$ surface by using a confocal microscope and by each height profile of a granular part surrounded by a contour in the two dimensional image of the surface obtained; the 1 mm$^2$ surface being heated at 1000° C. for 1 hour in an atmosphere containing 20% by volume or more of hydrogen and balance argon, and HS is a lowest height that is regarded as a base line in an area of ±25 µm in a plane direction and a rolling direction from the position of HM.

Preferably, in the copper foil for producing graphene of the present invention, a purity of Cu is 99.95 to 99.995% by mass.

Preferably, the copper foil for producing graphene of the present invention consists of tough pitch copper in accordance with JIS-H3100; or consists of oxygen free copper in accordance with JIS-H3100, or contains 0.050% by mass or less of one or more of elements selected from the group consisting of Sn and Ag to the tough pitch copper or the oxygen free copper.

Further, the present invention provides a method of producing graphene using the copper foil for producing graphene, comprising the steps of: providing a carbon-containing gas while placing the heated copper foil to form graphene on a surface of the copper foil for producing graphene; laminating a transfer sheet on the surface of the graphene, and etching and removing the copper foil for producing graphene while transferring the graphene to the transfer sheet.

Effect of the Invention

According to the present invention, there can be provided a copper foil being capable of producing graphene having a large area with low costs.

DESCRIPTION OF THE EMBODIMENTS

Hereinafter, a copper foil for producing graphene and a method of producing graphene according to an embodiment of the present invention will be described. The symbol "%" herein refers to % by mass, unless otherwise specified.
<First Aspect of the Invention>

According to a first aspect of the invention, a copper foil includes an oxide and a sulfide each having a diameter of 0.5 µm or more having a total number of 15/mm² or less measured by using a scanning electronic microscope before heating at 1000° C. for 1 hour in an atmosphere containing 20% by volume or more of hydrogen and balance argon.

The present inventor sought the cause of the increase in the sheet resistance of graphene and the poor quality when graphene is produced using the copper foil as the substrate, and found that the copper foil is uneven, thereby inhibiting the growth of graphene. Specifically, each carbon atom bond in graphene is in the order of nm, but a surface irregularity of the surface of the copper foil is in the order of µm. It is contemplated that when the surface irregularity (unevenness) of the surface of the copper foil is large, the carbon atom bonds in graphene are cut, resulting in the high sheet resistance.

If a high purity copper foil including over 99.995% by mass of Cu is used, there can be provided a smooth copper foil having low surface unevenness. However, the copper foil is produced at high costs and has a limited size.

The present inventor found that when the oxide and the sulfide of the copper foil contained in an ingot to manufacture the copper foil by rolling are heated at a temperature of around 1000° C. where graphene is produced, bulges, scoops or pits are generated to induce the irregularity on the surface of the copper foil. Based on the findings, by limiting the size and the number of the oxide and the sulfide present on the surface of the copper foil (or within the copper foil), high quality graphene can be produced.

A reason why the oxide and the sulfide are specified before heating at 1000° C. for 1 hour in an atmosphere containing 20% by volume or more of hydrogen and balance argon is that the oxide and the sulfide present near the surface of the copper foil evaporate in the vicinity of 1000° C. as described above, and the surface of the copper foil is broken to generate bulges, scoops or pits.

In addition, a reason why the oxide and the sulfide are specified each having a diameter of 0.5 µm or more is that the oxide and the sulfide each having a diameter of 0.5 µm or more easily generate the irregularity on the surface of the copper foil.

Figure 8:
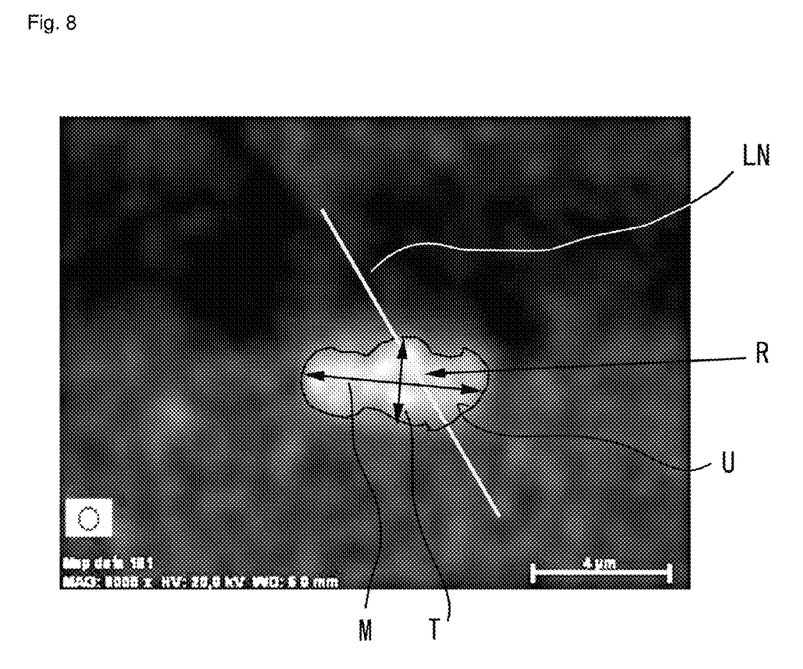
FIG. 8 A mapping of oxygen by a surface analysis using a scanning electronic microscope.

Herein, the diameter is measured as shown in FIG. 8. Firstly, oxygen and sulfur are observed by mapping using a surface analysis by a scanning electronic microscope with an energy dispersive X-ray analysis (EDX) per 1 mm×1 mm field of view of the surface of the copper foil. FIG. 8 shows a mapping of oxygen. Next, an area with a highest concentration of oxygen or sulfur (symbol R in FIG. 8) is selected within a mapping area, and a line analysis (symbol LN in FIG. 8) having a length of 10 µm is performed across the area. This is because the line analysis has a high measurement accuracy in an element concentration whereas the mapping is difficult to determine an absolute value of the element concentration accurately.

Then, in the line analysis, a lowest concentration value of oxygen or sulfur is defined as a basis. A position having the concentration is 5% by mass higher than the basis is collated with the mapping. A color tone in the position having the concentration is 5% by mass higher than the basis within a mapping area is determined. The position having the higher concentration than the color tone (i.e., the position having the concentration is 5% by mass higher than the basis) is regarded as the oxide or the sulfide. On the mapping area, an aggregate (a contour U in FIG. 8) of the position having the concentration is 5% by mass higher than the basis is determined to be regarded as the area of the oxide or the sulfide. A maximum length M and a length T in its vertical direction of the area are measured, and an average value of these values is determined. The average value is considered as a diameter of the oxide or the sulfide. A total number of the oxide and the sulfide having the diameter of 0.5 µm or more is 15/mm² or less.
<Second Aspect of the Invention>

According to a second aspect of the invention, the copper foil includes the oxide and the sulfide each having a diameter of 0.5 µm or more having a total number of 100/mm² or less measured for an area having a total area of 3 mm² within a depth of 10 µm from a surface that is a cross-section in parallel with a rolling direction and vertical to a rolling surface by using a scanning electronic microscope before heating at 1000° C. for 1 hour in an atmosphere containing 20% by volume or more of hydrogen and balance argon.

Similar to the first invention as described above, when the oxide or the sulfide in the copper foil is heated at about 1000° C., irregularity is generated on the surface of the copper foil. The oxide or the sulfide can be measured on the cross-section of the copper foil.

Here, the reason why the depth from the surface to 10 μm is measured is that the irregularity is less generated on the surface of the copper foil if the oxide or the sulfide is present distant from the surface of the copper foil. A measuring method and a counting method of the oxide and the sulfide is the same in the first aspect of the invention. In addition, as the oxide and the sulfide are dispersed relatively uniformly within the copper foil, the cross-section may be acquired at any position of the copper foil.

<Third Aspect of the Invention>

According to a third aspect of the invention, the irregularity generated on the surface of the copper foil after heating at 1000° C. for 1 hour in an atmosphere containing 20% by volume or more of hydrogen and balance argon is defined as follows: Firstly, the surface of the copper foil (1 mm$^2$) after heating at 1000° C. for 1 hour in an atmosphere containing 20% by volume or more of hydrogen and balance argon is measured by using a confocal microscope to provide information point by point in a height direction of a granular part surrounded by a contour in a two dimensional image of the surface obtained. On the software of the confocal microscope, when a predetermined position of the two dimensional image is designated, the height information at the position can be outputted.

Figure 2:
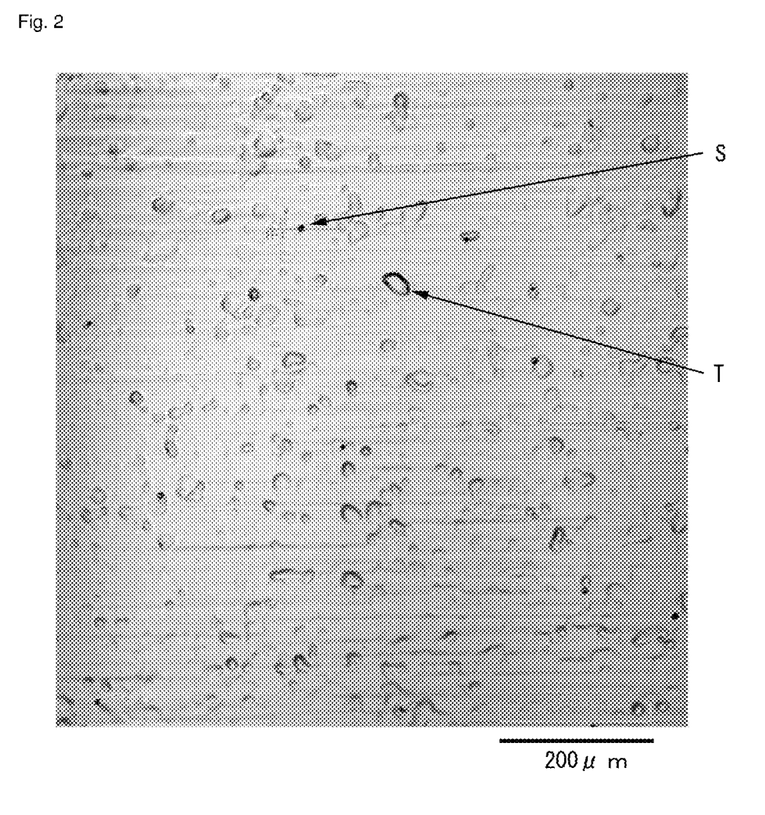
FIG. 2 An example of a confocal microscope image of a surface of a copper foil.
Figure 3:
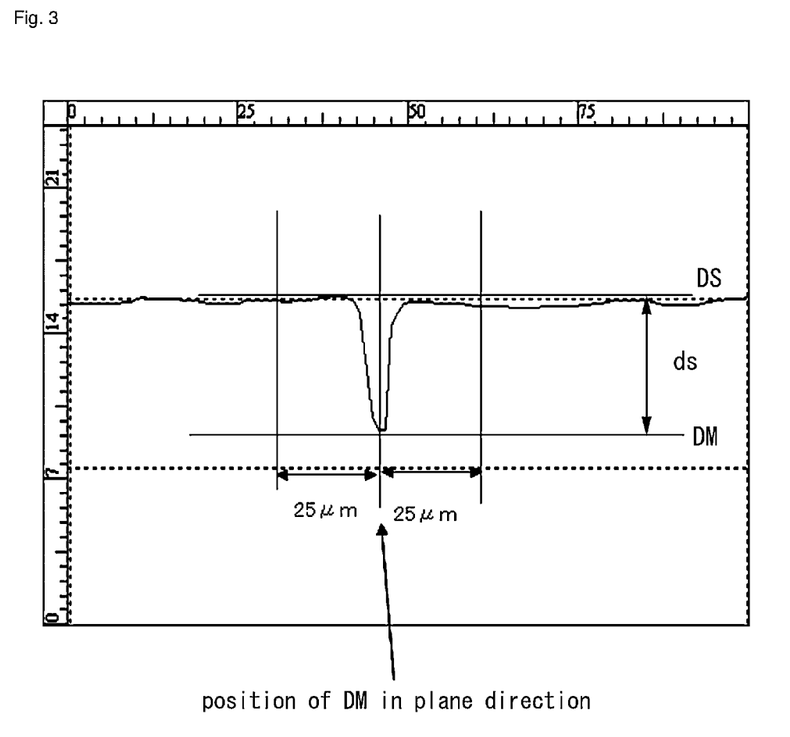
FIG. 3 A height profile of a granular part at point S (corresponds to a dent portion) in FIG. 2.

FIG. 2 is the two dimensional image showing an example of a confocal microscope image of the surface of the copper foil. FIG. 3 shows a height profile of the granular part as an S point (corresponds to the dent portion) in FIG. 2. A depth ds of the dent portion is determined by the equation: ds=DS−DM; where DM is a lowest height, and DS is a highest height that is regarded as a base line in an area of ±25 μm along a plane direction and a rolling direction from the position of DM.

The dent portion having a depth ds of 1.5 μm or more is countered. The number of the dent portion should be 20/mm$^2$ or less.

If the number of the dent portion exceeds 20/mm$^2$, the irregularity of the surface of the copper foil becomes remarkable and it is difficult to produce high quality graphene.

<Fourth Aspect of the Invention>

According to a fourth aspect of the invention, the irregularity generated on the surface of the copper foil after heating at 1000° C. for 1 hour in an atmosphere containing 20% by volume or more of hydrogen and balance argon is defined as follows: Firstly, similar to the third invention, the surface of the copper foil (1 mm$^2$) after heating at 1000° C. for 1 hour is measured by using a confocal microscope to provide information point by point in a height direction of a granular part surrounded by a contour in a two dimensional image of the surface obtained.

Figure 4:
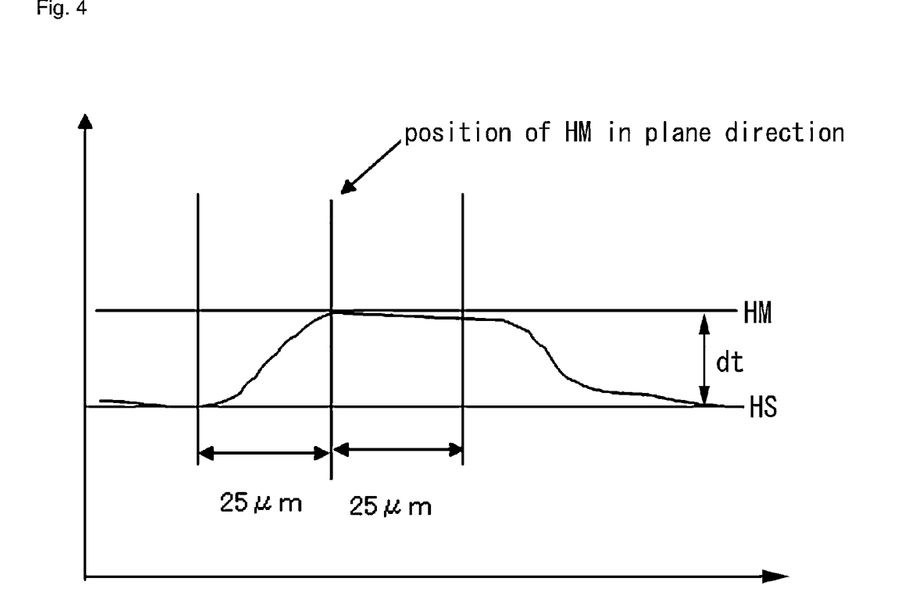
FIG. 4 A height profile of a granular part at point T (corresponds to a convex portion) in FIG. 2.

FIG. 2 shows an example of a confocal microscope image of the surface of the copper foil. FIG. 4 shows height information of the granular part as a T point (corresponds to the convex portion) in FIG. 2. A height dt of the convex portion is determined by the equation: dt=HM−HS; where HM is a highest height, and HS is a lowest height that is regarded as a base line in an area of ±25 μm in a plane direction and a rolling direction from the position of HM.

The convex portion having a height dt of 1.5 μm or more is countered. The number of the convex portion should be 100/mm$^2$ or less.

If the number of the convex portion exceeds 100/mm$^2$, the irregularity of the surface of the copper foil becomes remarkable and it is difficult to produce high quality graphene.

The maximum value of the ds is preferably 14 μm or less, more preferably, 10 μm or less, and most preferably 6 μm or less. The maximum value of the dt is preferably 16 μm or less, more preferably, 10 μm or less, and most preferably 6 μm or less.

<Composition of Copper Foil>

As the copper foil, tough pitch copper (TPC) in accordance with JIS-H3100 or oxygen free copper (OFC) in accordance with JIS-H3100 can be used.

In addition, to the tough pitch copper or the oxygen free copper, a composition containing 0.050% by mass or less of one or more of elements selected from the group consisting of Sn and Ag can be used. When the above-described elements are contained, the copper foil can have improved strength and adequate elongation, and the grain size can be increased. If a content percentage of the above-described elements exceeds 0.050% by mass, the strength may be further increased, but the elongation may be decreased to degrade workability and suppress the growth of the grain size. More preferably, the content percentage of the above-described elements is 0.040% by mass or less.

Although a lower limit of the content percentage of the above-described elements is not especially limited, for example the lower limit may be 0.001% by mass, or the lower limit may be 0.005% by mass. If the content percentage of the above-described elements is less than 0.001% by mass, the content percentage may be difficult to be controlled.

A concentration of Cu in the copper foil is preferably 99.95 to 99.995% by mass. If the concentration of copper foil is less than 99.95% by mass, the oxide or the sulfide is easily present on the surface of the copper foil and the irregularity of the surface of the copper foil may be large, as described above. On the other hand, if the Cu concentration in the copper foil is high, the production costs become high and the strength is decreased, whereby it is difficult to produce the foil and to provide the large area. In view of the above, it is preferable that the concentration of Cu in the copper foil be 99.995% by mass or less.

<Thickness>

The thickness of the copper foil is not especially limited, but is generally 5 to 150 μm. Preferably, the thickness of the copper foil is 12 to 50 μm for ease of etching and removal as described later while assuring handleability. If the thickness of the copper foil is less than 12 μm, it may be easily broken and have less handleability. If the thickness exceeds 50 μm, etching and removal may be difficult.

<Production of Copper Foil for Producing Graphene>

The copper foil for producing graphene according to the embodiment of the present invention can be produced as follows, for example: Firstly, a copper ingot having a predetermined composition is produced, is hot rolled, and is annealed and cold rolled repeatedly to provide a rolled sheet. The rolled sheet is annealed to be re-crystallized, and finally cold rolled to the predetermined thickness of a rolling reduction of 80 to 99.9% (preferably 85 to 99.9%, more preferably 90 to 99.9%), thereby providing a copper foil.

Here, when the oil film equivalent is 18000 or less both at a final pass of the final cold rolling and at a previous pass before the final pass of the final cold rolling, the surface of the copper foil becomes advantageously smooth.

When the surface of the copper foil is smooth, it is preferable for growing the crystal grains annealed. The degree of smoothness of the surface of the copper foil can be represented by the degree of gloss on the surface of the copper foil. Specifically, an oil pit (the irregularity) is generated as the phenomenon upon rolling on a rolling processed surface when the oil film that is introduced between the roll and the material is thick. When the oil film is thin, an area that is contacted with the rolling roll on the surface of the material is increased. As a result, free deformation is limited, the oil pit does not grown, a smooth surface profile of the rolling roll is transferred and a smooth surface is formed. Because of this, as an indicator of the thin oil film, the oil film equivalent is limited to 18000 or less. If the oil film equivalent exceeds 18000, a base roughness of the surface of the copper foil may exceed 20 μm.

The oil film equivalent is represented by the following equation:

(Oil film equivalent)={(rolling oil viscosity, kinetic viscosity at 40° C., cSt)×(rolling speed; m/min)}/{(yield stress of material; kg/mm$^2$)×(roll angle of bite; rad)}

In order to limit the oil film equivalent to 18000 or less, it is preferable that the rolling oil viscosity (kinetic viscosity at 40° C.) is low, the rolling speed is low, and the roll angle of bite (corresponding to a rolling reduction) is high. For example, by a rolling roll adjusted to have a roll diameter of 250 mm or less and surface roughness $Ra_{roll}$ of 0.1 μm or less (preferably 0.01 to 0.04 μm, more preferably 0.01 to 0.02 μm), rolling oil having a viscosity of 3 to 8 cSt (preferably 3 to 5 cSt, more preferably 3 to 4 cSt) is used. A rolling speed may be 100 to 500 m/min (preferably 200 to 450 m/min, more preferably 250 to 400 m/min), and the rolling reduction per pass may be 10 to 60%. The roll angle of bite is, for example, 0.001 to 0.04 rad, preferably 0.002 to 0.03 rad, more preferably 0.003 to 0.03 rad.

If the surface roughness $Ra_{roll}$ of the rolling roll exceeds 0.1 μm, the irregularity of the roll surface is transferred and smoothness of the material surface is impaired. By rolling under the above-described conditions, a surface flatness having no oil pit can have a wide area. If the viscosity of the rolling oil exceeds 8 cSt, the oil film equivalent is increased, thereby providing no surface gloss. On the other hand, if the oil film equivalent is less than 3 cSt, rolling resistance is too increased to increase the rolling reduction. If the rolling speed exceeds 500 m/min, the oil amount introduced is increased, thereby decreasing the gloss. On the other hand, if the rolling speed is less than 100 m/min, the rolling reduction is not sufficiently provided and it is inconvenience from the standpoint of the productivity.

If the rolling reduction exceeds 99.9%, work hardening is accelerated to lose deformation capability, and the rolling reduction in the last pass is not ensured. On the other hand, if the rolling reduction is less than 80%, a rolling texture is not grown, thereby providing no surface flatness. If the roll angle of bite exceeds 0.04 rad, a difference between a roll peripheral speed and a material speed becomes great to lose the smoothness of the material surface. On the other hand, the roll angle of bite is less than 0.002 rad, the oil enters between the rolling roll and the material to be rolled and the amount of the oil is too great to lubricate, thereby decreasing the gloss.

The rolling reduction per pass is, for example, 20 to 40%, preferably 20 to 35%, more preferably 25 to 35%. If the rolling reduction exceeds 35%, the oil pit is produced, thereby decreasing the gloss. On the other hand, if the rolling reduction is less than 20%, the number of passes increases to degrade the productivity.

Furthermore, as another method to smooth the surface of the copper foil, a material temperature is increased during the final cold rolling. When the material temperature is increased, dislocation recovery is induced to smooth the surface of the copper foil. The material temperature is such that oil lubricity is not lost or the copper foil is not re-crystallized, and may be 120° C. or less, preferably 100° C. or less. If the material temperature is 50° C. or less, there is almost no effect to smooth the surface of the copper foil.

<60 Degree Gloss>

60 degree gloss (JIS Z8741) of the copper foil is preferably 400% or more, and more preferably 500% or more both in a rolling direction and a direction transverse to rolling direction.

As described later, after graphene is produced using the copper foil for producing graphene according to the present invention, the graphene is needed to be transferred from the copper foil to a transfer sheet. It is found that when a surface of the copper foil is rough, it is difficult to be transferred, and the graphene may be broken. Therefore, it is preferable that the surface irregularity of the copper foil be smooth.

An upper limit of the 60 degree gloss in a rolling direction and a direction transverse to rolling direction is not especially limited. When the upper limit is less than 500%, production conditions for rolling processing may not be strictly specified upon the production of the copper foil, whereby advantageously increasing a degree of production freedom. Practically, the upper limit of the 60 degree gloss in a rolling direction and a direction transverse to rolling direction is about 800%.

<Average Crystal Grain Size>

By heating the copper foil after the final cold rolling at 1000° C. for 1 hour in an atmosphere containing 20% by volume or more of hydrogen and balance argon, an average crystal grain size of the copper foil heated grows to 100 μm or more.

If the average crystal grain size of the copper foil is less than 100 μm, it makes an obstacle for growth of the graphene, and the graphene is difficult to be grown in a planar direction.

The heating at 1000° C. for 1 hour in an atmosphere containing 20% by volume or more of hydrogen and balance argon is simulated for a condition of heating the copper foil for producing graphene at not less than a decomposition temperature of the carbon-containing gas when graphene is produced.

Further, the average crystal grain size is determined by measuring the copper foil with a cutting method by JIS H0501.

Using the copper foil for producing graphene as specified above, the large area graphene can be produced at low costs and a high yield.

<Production of Copper Foil for Producing Graphene>

The copper foil for producing graphene according to the embodiment of the present invention can be produced as follows, for example: Firstly, tough pitch copper (JIS-H3100) or oxygen free copper (JIS-H3100) is used as it is, or by adding the predetermined elements as necessary, a copper ingot is produced to have a purity of 99.95% by mass or more. The ingot is hot rolled, and is annealed and cold rolled repeatedly to provide a rolled sheet. The rolled sheet is annealed to be re-crystallized, and finally cold rolled to the predetermined thickness of a rolling reduction of 80 to 99.9% (preferably 85 to 99.9%, more preferably 90 to 99.9%), thereby providing a copper foil.

<Method of Producing Graphene>

Next, referring to FIG. 1, a method of producing graphene according to the embodiment of the present invention will be described.

First, the above-described copper foil 10 for producing graphene of the present invention is placed in a chamber (such as a vacuum chamber) 100 and is heated by a heater 104. At the same time, the pressure in the chamber 100 is reduced or the chamber 100 is vacuum-evacuated. Then, a carbon-containing gas G is fed to the chamber 100 through a gas supply inlet 102 (FIG. 1(a)). As the carbon-containing gas G, carbon dioxide, carbon monoxide, methane, ethane, propane, ethylene, acetylene, alcohol or the like is cited, but is not limited thereto. One or more of these gases may be mixed. The copper foil 10 for producing graphene may be heated at a decomposition temperature of the carbon-containing gas G or more. For example, the temperature can be 1000° C. or more. Alternatively, the carbon-containing gas G may be heated at the decomposition temperature or more within the chamber 100, and the decomposed gas may bring into contact with the copper foil 10 for producing graphene.

Figure 1:
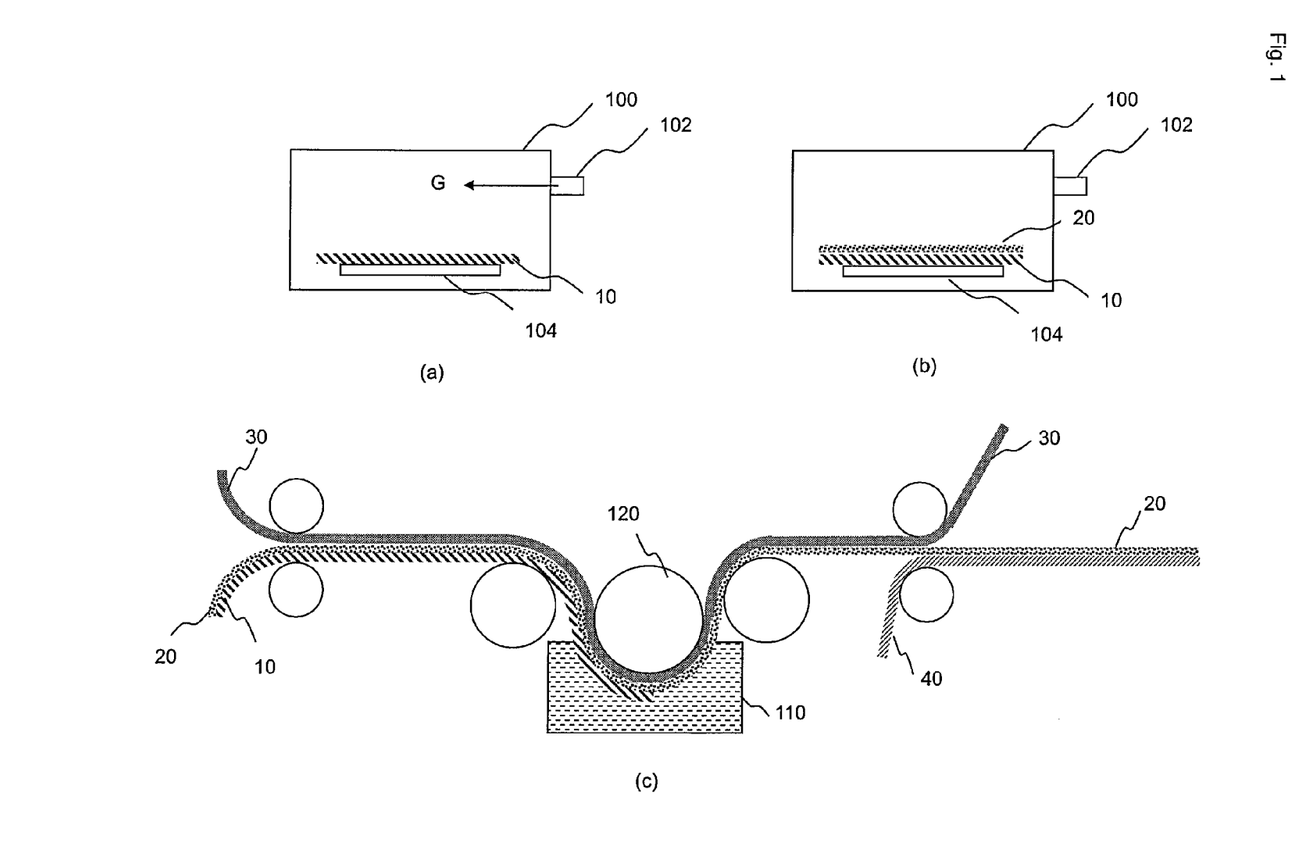
FIG. 1 A process chart showing a method of producing graphene according to an embodiment of the present invention.

Then, the decomposition gas (carbon gas) is contacted with the surface of the copper foil 10 for producing graphene, and graphene 20 is formed on the surface of the copper foil 10 for producing graphene (FIG. 1(b)).

Then, the copper foil 10 for producing graphene is cooled to normal temperature, a transfer sheet 30 is laminated on the surface of the graphene 20, and the graphene 20 is transferred to the transfer sheet 30. Next, the laminate is continuously immersed into an etching tank 110 via a sink roll 120, and the copper foil 10 for producing graphene is removed by etching (FIG. 1(c)). In this way, the graphene 20 laminated on the predetermined transfer sheet 30 can be produced.

In addition, the laminate from which the copper foil 10 for producing graphene is removed is pulled up, and a substrate 40 is laminated on the graphene 20. While the graphene 20 is transferred to the substrate 40, the transfer sheet 30 is removed, whereby the graphene 20 laminated on the substrate 40 can be produced.

As the transfer sheet 30, a variety of resin sheets (a polymer sheet such as polyethylene, polyurethane etc.) can be used. As an etching reagent for etching and removing the copper foil 10 for producing graphene, a sulfuric acid solution, a sodium persulfate solution, a hydrogen peroxide and sodium persulfate solution, or a solution where sulfuric acid is added to hydrogen peroxide can be, for example, used. As the substrate 40, an Si, SiC, Ni or Ni alloy can be, for example, used.

EXAMPLE

Preparation of Sample

A copper ingot having a composition shown in Table 1 was prepared, was hot rolled at 800 to 900° C., and was annealed in a continuous annealing line at 300 to 700° C. and cold rolled, which was repeated one time, to provide a rolled sheet having a thickness of 1 to 2 mm. The rolled sheet was annealed and re-crystallized in the continuous annealing line at 600 to 800° C., and was finally cold rolled to a thickness of 7 to 50 μm of a rolling reduction of 95 to 99.7% to provide each copper foil in each Example and Comparative Example.

The tough pitch copper (TPC) used in each Example and Comparative Examples 4 and 5 was produced by lowering the oxygen concentration in the heating gas in a step of melting raw materials in a shaft furnace. As an indicator of the oxygen concentration in the heating gas, a carbon monoxide concentration was measured such that the carbon monoxide concentration was 2 to 7%.

In the tough pitch copper used in Comparative Examples 1 to 3, each carbon monoxide concentration in the heating gas in the shaft furnace was 0.5 to 1.5%.

The carbon monoxide concentration and the oxygen concentration was controlled by changing the flow rate of air fed to the fuel gas.

Here, the oil film equivalents were adjusted to the values shown in Table 1 both at a final pass of the final cold rolling and a previous pass before the final pass of the final cold rolling.

The oil film equivalent is represented by the following equation:

(Oil film equivalent)={(rolling oil viscosity, kinetic viscosity at 40° C., cSt)×(rolling speed; m/min)}/ {(yield stress of material; kg/mm$^2$)×(roll angle of bite; rad)}

As to the copper foil having the Cu purity of 99.9999% (Reference Example 1), copper having a purity of 99.99999% or more was used as the raw material, was re-melted under vacuum, and was molded into a mold having a thickness of 30 mm and a width of 100 mm under vacuum to provide an ingot. The ingot was surface machined, pickling, rolled and heated repeatedly to have a thickness of 35 μm. As to the copper foil having the Cu purity of 99.999% (Reference Example 2), copper having a purity of 99.9999% or more was used as the raw material, was re-melted under vacuum to provide an ingot. Thereafter, the sample was produced similar to Reference Example 1.

<Measurement of Surface Roughness (Ra, Rz, Sm)>

After final cold-rolling and heating of the copper foil in each Example and Comparative Example at 1000° C. for 1 hour in an atmosphere containing 20% by volume or more of hydrogen and balance argon, a surface roughness was measured.

Arithmetic mean deviation of assessed profile (Ra: μm) in accordance with JIS-B0601 and a total height of profile (Rt: μm) were measured per 1 mm×1 mm field of view by a confocal microscope (manufactured by Lasertec Corporation, model No.: HD100D). The Sm is defined as "Mean width of the profile elements" by JIS B0601-2001 (in accordance with ISO4287-1997) that represents a surface texture by a profile curve method, and refers to an average of profile lengths of respective irregularities in a sampling length.

<Number of Oxide and Sulfide on Surface>

The number of the oxide and the sulfide each having a diameter of 0.5 μm or more were measured per 1 mm×1 mm field of view of the surface of the copper foil not heated using a scanning electronic microscope with an energy dispersive X-ray analysis (EDX) by the above-described method.

<Number of Oxide and Sulfide at Cross-Section>

Any cross-section parallel to the rolling direction of the copper foil not heated was produced. An area having a total area of 3 mm$^2$ within a depth of 10 μm from a surface was measured for an elemental analysis by the scanning electronic microscope to measure the number of the oxide and the sulfide each having a diameter of 0.5 μm or more by the above-described method.

<Number of Dent Portion and Convex Portion on Surface>

The surface of the copper foil (1 mm$^2$) after heating at 1000° C. for 1 hour in an atmosphere containing 20% by volume or more of hydrogen and balance argon was measured by the confocal microscope (manufactured by Lasertec Corporation, model No.: HD100D, analysis software: LM eye (manufactured by Lasertec Corporation), scan timer: 60 sec)

to provide a two dimensional image. Information in a height direction of a granular part surrounded by a contour in the two dimensional image of the surface obtained was determined point by point. On the software of the confocal microscope, when a predetermined position of the two dimensional image is designated, the height information at the position can be outputted.

FIG. 2 shows an example of a confocal microscope image of the surface of the copper foil. FIG. 3 shows a height profile of the granular part as an S point (corresponds to the dent portion) in FIG. 2. A depth ds of the dent portion is determined by the equation: ds=DS−DM; where DM is a lowest height, and DS is a highest height that is regarded as a base line in an area of ±25 μm along a plane direction and a rolling direction from the position of DM. FIG. 4 shows height information of the granular part as a T point (corresponds to the convex portion) in FIG. 2. A height dt of the convex portion is determined by the equation: dt=HM−HS; where HM is a highest height, and HS is a lowest height that is regarded as a base line in an area of ±25 μm along a plane direction and a rolling direction from the position of HM.

The ds or dt of 1.5 μm or more was counted as the dent portion or the convex portion.

<Production of Graphene>

The copper foil for producing graphene (horizontal and vertical of 100×100 mm) in each Example was wound around an inner wall of a quartz tube (3 inches) within an infrared image furnace and was vacuumed (pressure: 0.2 Torr). Next, while a mixed gas of hydrogen and argon was flowed into the quartz tube, the infrared image furnace was heated to 1000° C. In addition, methane gas (feed gas flow rate: 10 to 100 cc/min) was flowed thereinto, which was held for one hour, and the reaction was thus performed.

A PET film was adhered to the copper foil at a graphene side where graphene was grown on the surface, and the copper foil was etched and removed by acid. Thereafter, a sheet resistance of graphene was measured by a four probe method. A reaction time was determined by finding out the relationship between the reaction time and the sheet resistance in advance and was the time needed for stabilizing the sheet resistance.

When the sheet resistance of graphene is 400 Ω/square or less, there is no practical problem.

The results are shown in Tables 1 and 2. In Tables, TPC denotes tough pitch copper in accordance with JIS-H3100, and OFC denotes oxygen free copper in accordance with JIS-H3100. Accordingly, "OFC+Sn 1200 ppm" denotes that 1200 wtppm of Sn was added to oxygen free copper in accordance with JIS-H3100.

TABLE 1

| | Composition (wtppm) | Oil film equivalent at previous pass before final pass of final cold rolling | Oil film equivalent at final pass of final cold rolling | Thickness (μm) | Surface roughness after final rolling (μm) | | | Number of oxides and sulfides on surface (number/mm2) | Number of oxides and sulfides at cross-section (number/mm2) |
|---|---|---|---|---|---|---|---|---|---|
| | | | | | Ra | Rt | Rsm | | |
| Example 1 | TPC | 15,000 | 15,000 | 18 | 0.045 | 0.555 | 9.247 | 12 | 84 |
| Example 2 | TPC | 15,000 | 15,000 | 35 | 0.048 | 0.558 | 9.765 | 10 | 74 |
| Example 3 | TPC | 15,000 | 15,000 | 50 | 0.049 | 0.543 | 9.548 | 10 | 68 |
| Example 4 | OFC | 12,000 | 12,000 | 35 | 0.030 | 0.349 | 8.044 | 1 | 1 |
| Example 5 | OFC + Sn1200 ppm | 12,000 | 12,000 | 35 | 0.080 | 0.658 | 9.624 | 2 | 5 |
| Example 6 | TPC + Ag190 ppm | 15,000 | 15,000 | 18 | 0.044 | 0.502 | 9.357 | 8 | 79 |
| Example 7 | TPC + Ag190 ppm | 15,000 | 15,000 | 35 | 0.046 | 0.508 | 9.145 | 7 | 73 |
| Example 8 | TPC + Ag190 ppm | 15,000 | 15,000 | 50 | 0.047 | 0.498 | 9.258 | 7 | 66 |
| Example 9 | TPC + Ag100 ppm | 15,000 | 15,000 | 35 | 0.042 | 0.486 | 9.007 | 6 | 22 |
| Example 10 | TPC + Ag300 ppm | 15,000 | 15,000 | 35 | 0.051 | 0.512 | 9.282 | 7 | 27 |
| Example 11 | OFC + Sn80 ppm | 12,000 | 12,000 | 35 | 0.032 | 0.337 | 9.518 | 0 | 1 |
| Example 12 | OFC + Sn300 ppm | 12,000 | 12,000 | 35 | 0.038 | 0.412 | 9.585 | 0 | 2 |
| Example 13 | OFC + Sn470 ppm | 12,000 | 12,000 | 35 | 0.069 | 0.511 | 9.613 | 1 | 3 |
| Example 14 | OFC + Ag10 ppm | 12,000 | 12,000 | 35 | 0.031 | 0.487 | 9.157 | 1 | 1 |

| | Surface roughness after heating at 1000° C. (μm) | | | Number of dent portion (number/mm2) | Number of conves portion (number/mm2) | Minimum/maximum values at dent portion (μm) | Minimum/maximum values at convex portion (μm) | Sheet resistance of graphene Ω/square |
|---|---|---|---|---|---|---|---|---|
| | Ra | Rt | Rsm | | | | | |
| Example 1 | 0.037 | 0.370 | 18.343 | 18 | 98 | 0.455 12.110 | 0.866 15.110 | 388 |
| Example 2 | 0.039 | 0.367 | 18.135 | 16 | 82 | 0.547 11.878 | 0.879 15.787 | 394 |
| Example 3 | 0.038 | 0.375 | 18.222 | 15 | 75 | 0.552 10.334 | 0.828 14.988 | 391 |

TABLE 1-continued

|  | | | | | | | | |
|---|---|---|---|---|---|---|---|---|
| Example 4 | 0.020 | 0.171 | 17.585 | 2 | 2 | 0.315 4.291 | 0.446 5.488 | 350 |
| Example 5 | 0.046 | 0.390 | 19.179 | 3 | 8 | 0.474 3.108 | 0.502 5.742 | 383 |
| Example 6 | 0.032 | 0.281 | 17.565 | 13 | 86 | 0.875 12.224 | 0.941 13.468 | 372 |
| Example 7 | 0.031 | 0.274 | 17.831 | 11 | 81 | 0.898 12.674 | 0.983 13.402 | 382 |
| Example 8 | 0.033 | 0.279 | 17.747 | 10 | 74 | 0.743 13.550 | 0.968 13.864 | 380 |
| Example 9 | 0.030 | 0.333 | 18.555 | 6 | 25 | 0.764 13.987 | 0.880 14.456 | 373 |
| Example 10 | 0.038 | 0.388 | 18.414 | 7 | 30 | 0.928 212.933 | 1.007 13.464 | 398 |
| Example 11 | 0.027 | 0.188 | 17.462 | 1 | 2 | 0.345 3.258 | 0.438 4.942 | 328 |
| Example 12 | 0.032 | 0.305 | 17.616 | 1 | 3 | 0.442 4.123 | 0.488 5.654 | 319 |
| Example 13 | 0.044 | 0.361 | 17.987 | 2 | 4 | 0.415 5.852 | 0.483 6.012 | 364 |
| Example 14 | 0.029 | 0.196 | 17.663 | 1 | 2 | 0.325 3.187 | 0.429 5.024 | 343 |

TABLE 2

| | Composition (wtppm) | Oil film equivalent at previous pass before final pass of final cold rolling | Oil film equivalent at final pass of final cold rolling | Thickness (μm) | Surface roughness after final rolling (μm) | | | Number of oxides and sulfides on surface (number/mm2) | Number of oxides and sulfides at cross-section (number/mm2) |
|---|---|---|---|---|---|---|---|---|---|
| | | | | | Ra | Rt | Rsm | | |
| Comparative Example 1 | TPC | 15,000 | 15,000 | 35 | 0.047 | 0.57 | 9.624 | 22 | 121 |
| Comparative Example 2 | TPC | 15,000 | 15,000 | 35 | 0.048 | 0.51 | 9.246 | 19 | 81 |
| Comparative Example 3 | TPC | 15,000 | 15,000 | 35 | 0.046 | 0.58 | 9.369 | 12 | 124 |
| Comparative Example 4 | TPC + Cr500 ppm | 15,000 | 23,000 | 35 | 0.038 | 0.62 | 12.88 | 25 | 135 |
| Comparative Example 5 | TPC + Al500 ppm | 15,000 | 23,000 | 35 | 0.040 | 0.56 | 13.22 | 18 | 117 |
| Reference Example 1 | 99.9999% Cu | 12,000 | 12,000 | 35 | 0.016 | 0.14 | 15.21 | 0 | 0 |
| Reference Example 2 | 99.999% Cu | 12,000 | 12,000 | 35 | 0.016 | 0.14 | 17.34 | 1 | 1 |

| | Surface roughness after heating at 1000° C. (μm) | | | Number of dent portion (number/mm2) | Number of convex portion (number/mm2) | Minimum/ maximum values at dent portion (μm) | Minimum/ maximum values at convex portion (μm) | Sheet resistance of graphene Ω/square |
|---|---|---|---|---|---|---|---|---|
| | Ra | Rt | Rsm | | | | | |
| Comparative Example 1 | 0.046 | 0.864 | 23.123 | 25 | 140 | 1.246 20.554 | 1.444 22.771 | >500 |
| Comparative Example 2 | 0.037 | 0.770 | 21.311 | 21 | 89 | 0.747 22.987 | 0.866 24.125 | >500 |
| Comparative Example 3 | 0.039 | 0.789 | 22.345 | 13 | 135 | 0.775 22.369 | 0.866 24.424 | >500 |
| Comparative Example 4 | 0.042 | 0.847 | 25.147 | 37 | 165 | 1.247 20.454 | 1.584 23.468 | >500 |
| Comparative Example 5 | 0.044 | 0.753 | 22.878 | 22 | 134 | 1.543 16.432 | 1.733 18.413 | >500 |
| Reference Example 1 | 0.028 | 0.285 | 18.548 | 0 | 0 | 0.029 0.110 | 0.048 0.123 | 111 |
| Reference Example 2 | 0.030 | 0.306 | 19.692 | 1 | 1 | 0.047 0.337 | 0.056 0.481 | 203 |

As apparent from Tables 1 and 2, in each of Examples where the total number of the oxide and the sulfide on the surface was 15/mm² or less, the total number of the oxide and the sulfide at the cross-section was 100/mm² or less, the number of the dent portion was 20/mm² or less and the dent portion was 100/mm² or less, the sheet resistance of graphene was 400 Ω/square or less and the quality was excellent.

On the other hand, in each of Comparative Examples where the total number of the oxide and the sulfide on the surface exceeded 15/mm², the total number of the oxide and the sulfide at the cross-section exceeded 100/mm², the number of the dent portion exceeded 20/mm² or the dent portion exceeded 100/mm², the sheet resistance of graphene exceeded 400 Ω/square and the quality of graphene was poor.

Each of Reference Examples 1 and 2 was the copper foil produced by decreasing an impurity amount of high purity copper (99.999%) using vacuum melting and had the total number of the oxide and the sulfide on the surface of 15/mm² or less. However, the production costs were high, a wide copper foil was difficult to be produced, and practicability was low.

Figure 5:
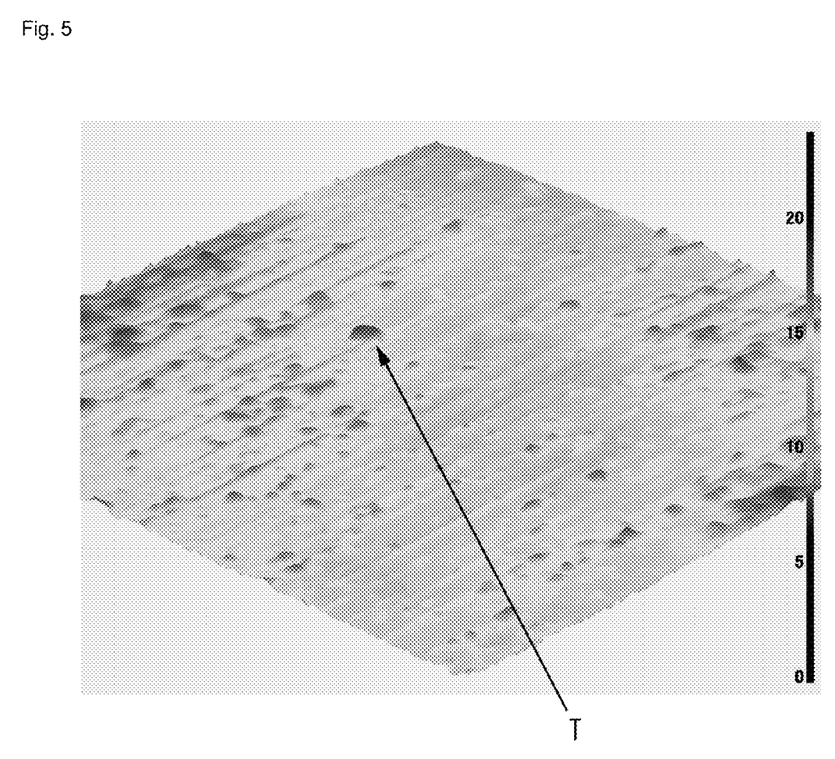
FIG. 5 A three dimensional image of the confocal microscope image in FIG. 2.
Figure 6:
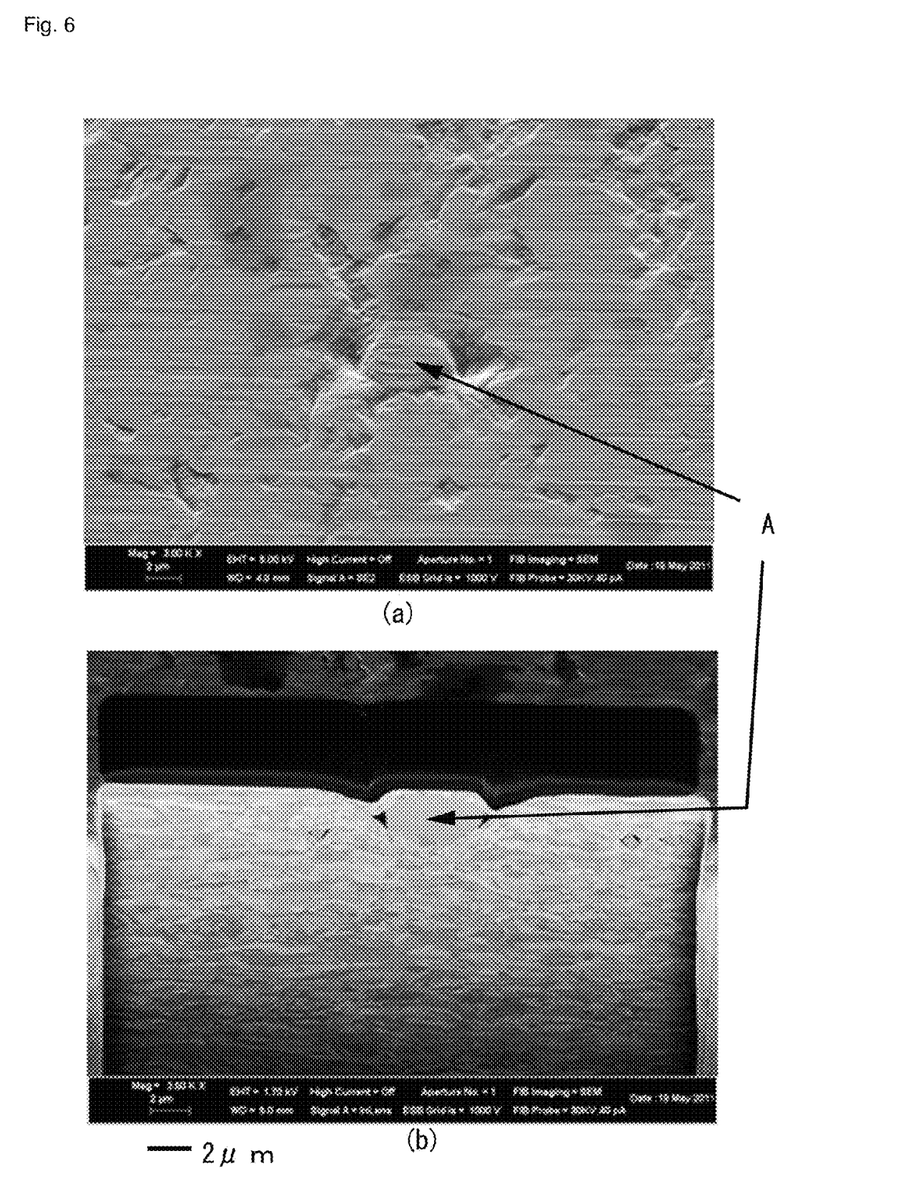
FIG. 6 An SEM image of a surface and a cross-section of a sample in Example 6 before heating.

FIG. 5 shows a three dimensional image of the confocal microscope image in FIG. 2. FIG. 6(a) shows an SEM image of a surface of the sample in Example 6 before heating. FIG. 6(b) shows a cross-section SEM image thereof. Viewing the cross-section of a detection section (symbol A) of the oxide reveals that the oxide was somewhat internally present rather than on the surface.

Figure 7:
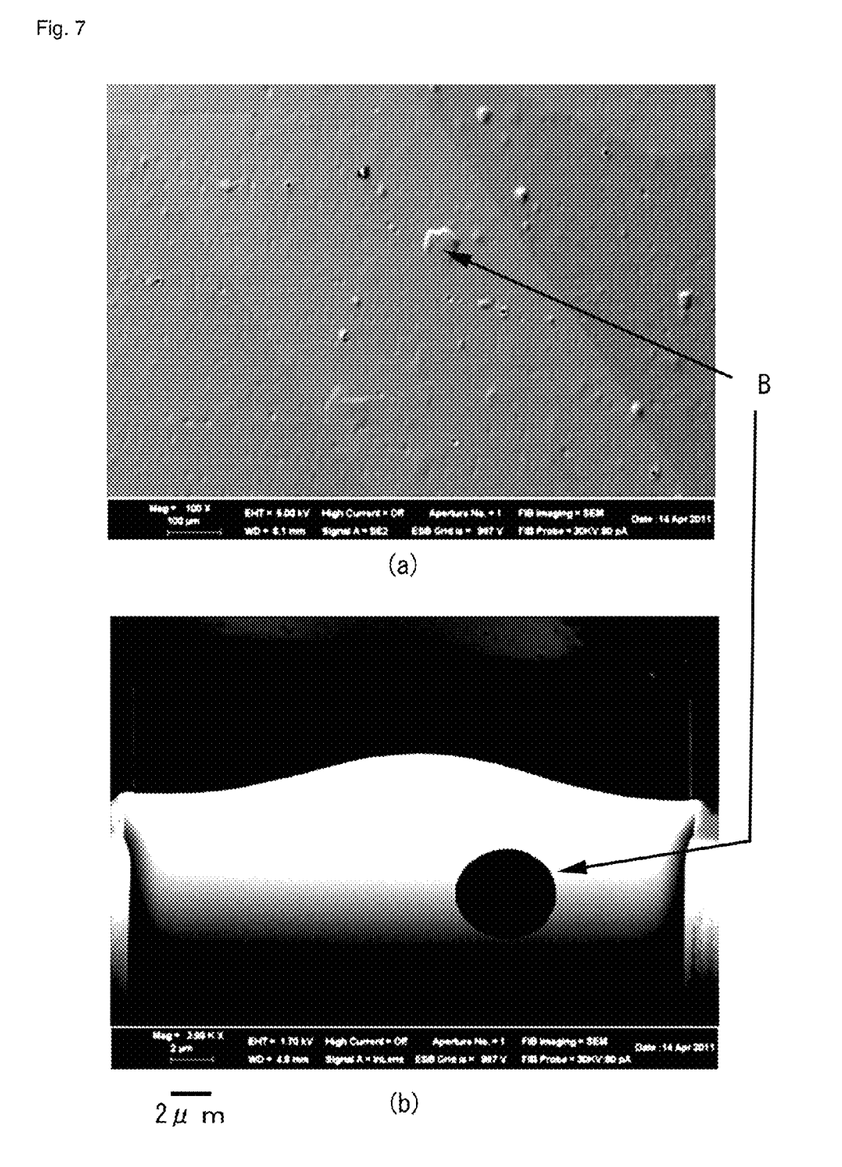
FIG. 7 An SEM image of a surface and a cross-section of a sample in Example 6 after heating.

FIG. 7(a) shows an SEM image of a surface of the sample in Example 6 after heating. FIG. 7(b) shows a cross-section SEM image thereof. Viewing the cross-section of the convex section (symbol B) reveals that the oxide was reduced, heated and evaporated, thereby raising the copper foil material on the surface.

EXPLANATION OF REFERENCE NUMERALS

10 copper foil for producing graphene
20 graphene
30 transfer sheet

What is claimed is:

1. A copper foil for producing graphene, as finally cold-rolled, including oxides and sulfides each having a diameter of 0.5 μm or more having a total number of 15/mm² or less measured by using a scanning electronic microscope before heating at 1000° C. for 1 hour in an atmosphere containing 20% by volume or more of hydrogen and balance argon.

2. A copper foil for producing graphene, as finally cold-rolled, including oxides and sulfides each having a diameter of 0.5 μm or more having a total number of 100/mm² or less measured for an area having a total area of 3 mm² within a depth of 10 μm from a surface that is a cross-section in parallel to a rolling direction by using a scanning electronic microscope before heating at 1000° C. for 1 hour in an atmosphere containing 20% by volume or more of hydrogen and balance argon.

3. A copper foil for producing graphene, as finally cold-rolled, having a number of dent portions being 20/mm² or less, each dent portion having a depth ds of 1.5 μm or more being counted; wherein ds=DS−DM; where DM is a lowest height of a height profile of a granular part surrounded by a contour in a two dimensional image obtained by measuring a 1 mm² surface of the copper foil using a confocal microscope after the surface is heated at 1000° C. for 1 hour in an atmosphere containing 20% by volume or more of hydrogen and balance argon, and DS is a highest height that is regarded as a base line in an area of ±25 μm along a plane direction and a rolling direction from the position of DM.

4. A copper foil for producing graphene, as finally cold-rolled, having a number of convex portions being 100/mm² or less, each convex portion having a height dt of 1.5 μm or more being counted; wherein dt=HM−HS; where HM is a highest height of a height profile of a granular part surrounded by a contour in a two dimensional image obtained by measuring a 1 mm² surface of the copper foil using a confocal microscope after the surface is heated at 1000° C. for 1 hour in an atmosphere containing 20% by volume or more of hydrogen and balance argon, and HS is a lowest height that is regarded as a base line in an area of ±25 μm in a plane direction and a rolling direction from the position of HM.

5. The copper foil for producing graphene according to claim 1, wherein a purity of Cu is 99.95 to 99.995% by mass.

6. The copper foil for producing graphene according to claim 1, prepared from a copper composition consisting of tough pitch copper in accordance with JIS-H3100, consisting of oxygen free copper in accordance with JIS-H3100, or consisting of a composition containing 0.050% by mass or less of one or more elements selected from the group consisting of Sn and Ag added to the tough pitch copper or the oxygen free copper.

7. A method of producing graphene using the copper foil for producing graphene according to claim 1, comprising the steps of:
   heating the copper foil for producing graphene and providing a carbon-containing gas to form graphene on a surface of the copper foil for producing graphene; and
   laminating a transfer sheet on the surface of the graphene, and etching and removing the copper foil for producing graphene while transferring the graphene to the transfer sheet.

* * * * *